June 23, 1959   G. S. MAIORINO   2,891,446
MICROSCOPE FINE ADJUSTMENT MECHANISM
Filed Jan. 16, 1956   2 Sheets-Sheet 2
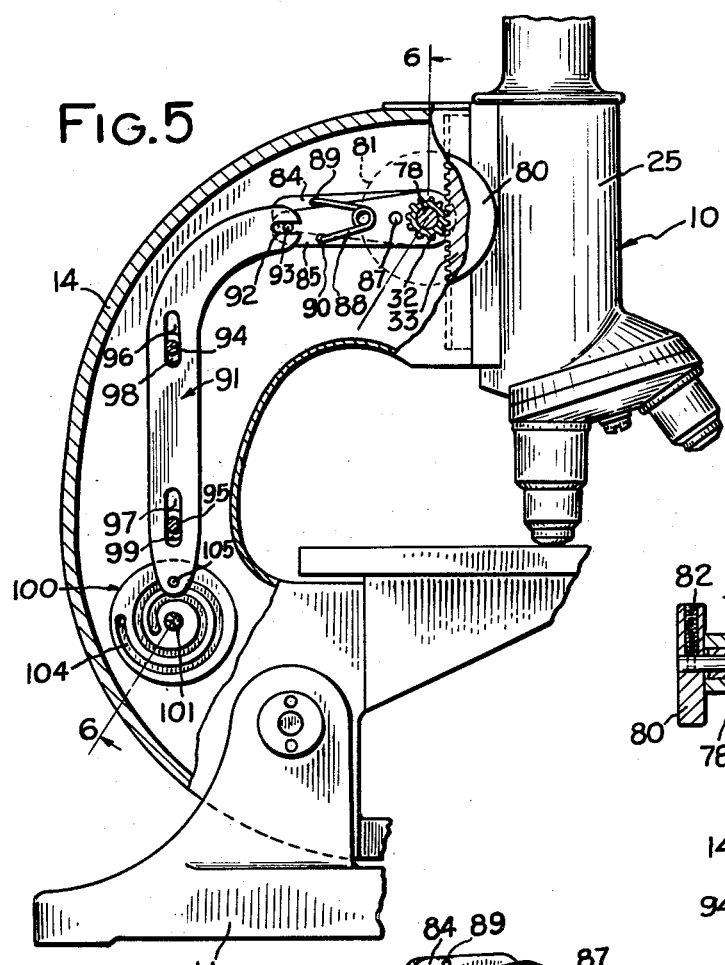
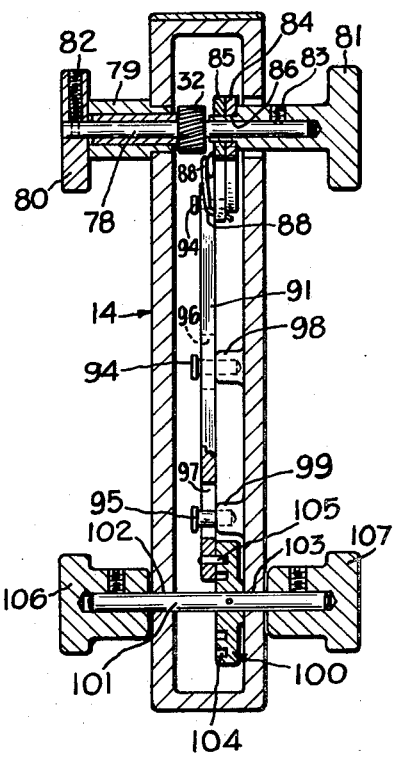
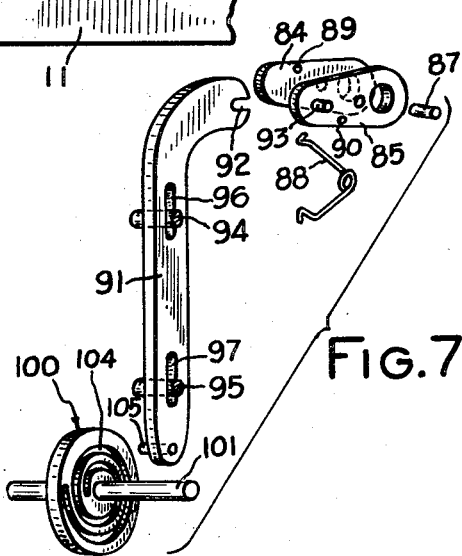
INVENTOR.
G. S. MAIORINO
BY
ATTORNEY

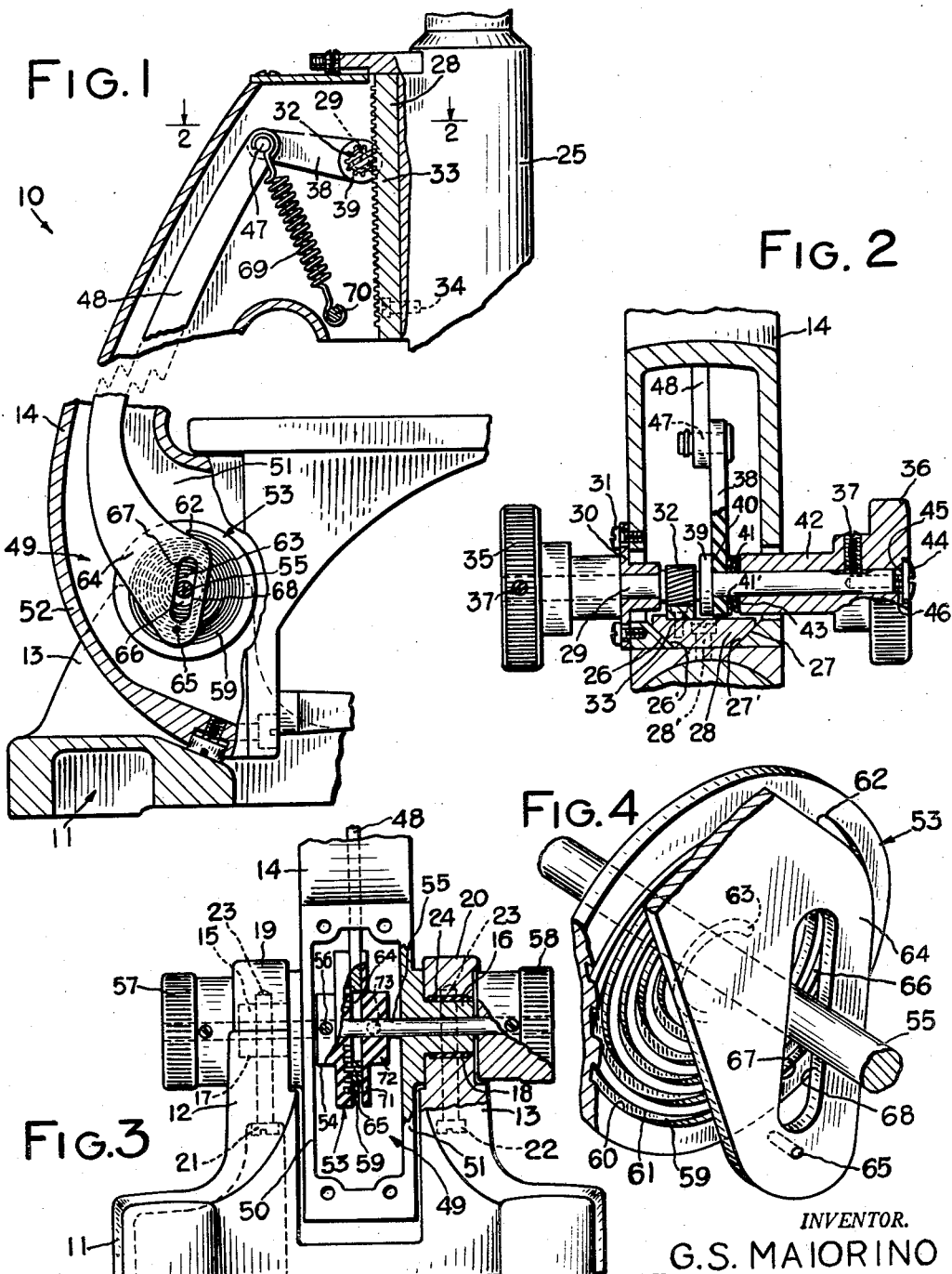

United States Patent Office 2,891,446
Patented June 23, 1959

2,891,446

MICROSCOPE FINE ADJUSTMENT MECHANISM

Gennaro S. Maiorino, Rochester, N.Y., assignor to Bausch & Lomb Optical Company, Rochester, N.Y., a corporation of New York Application January 16, 1956, Serial No. 559,467

4 Claims. (Cl. 88—39)

This invention relates to microscopes and the like and more particularly it relates to improvements in the fine adjustment mechanisms therefor.

In a low cost microscope it is difficult to produce a fine adjustment mechanism which has the smooth, accurate and slow rate of motion of an expensive instrument. Attempts to produce such fine adjustment mechanisms for cheaper microscopes usually result in sub-standard operation which includes roughness, inaccuracies in the rate of motion, and great limitations in the range of operation of the mechanism.

It is an object of this invention to provide a microscope fine adjustment mechanism which is not only very low in cost of manufacture but has a minimum slow rate of motion and a maximum large range of motion.

It is a further object to provide such a mechanism which is simple in form and smooth in operation, is sturdy and durable so as to maintain a high degree of precision in its operation during the life of the instrument, and requires a minimum of service to keep in the best operating condition.

Further objects and advantages will be apparent in the details of construction and combination and arrangement of the parts thereof by reference to the specification herebelow together with the accompanying drawings in which:

Fig. 1 is a fragmentary view of a microscope showing a preferred form of my invention, some parts thereof being broken away and shown in section.

Fig. 2 is a sectional view taken on the line 2—2 of Fig. 1.

Fig. 3 is a fragmentary side view of the base of the microscope with certain parts broken away and shown in section.

Fig. 4 is a fragmentary perspective view of certain operating parts of this invention.

Fig. 5 is a side view of a second form of this invention, parts thereof being partly broken away and shown in section.

Fig. 6 is a sectional view taken on the line 6—6 of Fig. 5, and

Fig. 7 is an expanded perspective view of certain operating parts pertaining to the second form of this invention.

A preferred form of this invention is shown in Fig. 1 wherein the microscope is designated generally by the numeral 10. The microscope comprises a base 11 on which two upstanding pillars 12 and 13 are formed whereon a hollow arm 14 is mounted inclinably by means of a pair of coaxial trunnions 15 and 16. Said trunnions are preferably formed integrally on said arm 14 and are seated in semi-cylindrical bearing seats 17 and 18 formed in the upper ends of said pillars 12 and 13, respectively.

Bearing caps 19 and 20 are provided to retain said trunnions 15 and 16, respectively, on the seats 17 and 18 and the caps are clamped thereon by cap screws 21 and 22 which extend upwardly through suitable clearance holes in the pillars 12 and 13 and are threaded from underneath the base into blind tapped holes 23 in the respective caps. Interposed between the trunnions 15 and 16 and their respective seats on the caps and pillars are thin contact strips 24 which extend around the trunnions and are formed from flat lengths of flexible, anti-frictional plastic material such as the material known by the tradename of "Teflon." For adjusting the braking pressure on the trunnions 15 and 16 so that the arm 14 may be securely held in any operating position, the screws 21 and 22 are appropriately tightened until the braking pressure on the trunnions is just sufficient to allow them to slip on their seats when tilting pressure is applied to the arm.

On the upper end of the arm 14, a lens or body tube 25, carrying an eyepiece and an objective (not shown), is slidably mounted on the arm 14 for focusing motion by means of a pair of dovetailed guideways 26 and 27 which are located on an optical tube slide 28 attached by the screws 28′ to the tube. These guideways 26 and 27 lie in cooperative engagement with a companion pair of guideways 26′ and 27′ formed on the arm 14. For moving the tube 25, a coarse adjustment shaft 29 is rotatably journaled in a bearing support member 30 which is secured in the upper end of said arm 14 by the screws 31. On the shaft 29 is fixed a pinion 32 which meshes with a rack 33 that is fixed to the slide 28 by screws 34 threaded into said slide. Knobs 35 and 36 anchored by means of the set screws 37 and 38 on the outer ends of the shaft 29 are provided for rotating the pinion 32 as best shown in Fig. 2.

According to this invention, fine adjustment mechanism is provided for rotating the shaft 29 comprising an operating lever 38 which is loosely journaled on said shaft. Frictional clutch means for connecting the lever 38 to the shaft 29 include a friction drive disk 39 which is preferably integrally formed on said shaft and has a flat radial surface 40 thereon lying in frictional engagement with said lever 38. The adjacent surface of lever 38 is yieldably pressed against the radial surface 40 preferably by a so-called "Belleville" type disk spring 41 acting against washer 41′ and is held in compression by a sleeve 42 having an abutment shoulder 43 whereon the spring is seated. Preferably the sleeve 42 is formed integrally with the knob 36 and this member is longitudinally anchored on the shaft 29 in such a location as to compress the spring 41 by an amount which applies the required thrust to the clutch. For adjusting the longitudinal location of said sleeve 42, there is provided an adjustment screw 44 bearing against an end surface 45 on the knob 36 and threaded into the end of the shaft 29. A clearance space 46 between the end of the shaft 29 and the end surface 45 is provided by properly proportioning the lengths of the sleeve 42 and shaft 29. It is preferred to form the lever 38 from a plastic material, such as the phenolic resin materials known by the tradenames of "Bakelite" or "Micarta" for instance, so as to secure an advantageous smooth operation of the friction clutch. The associated elements above described in this paragraph cooperate together and function in combination to provide an effective adjustable friction clutch for the fine adjustment mechanism.

At the outer end of the lever 38 is pivoted by means of a pivot pin 47, a rigid link 48 which extends downwardly through the hollow arm 14 to the proximity of its inclination joint. The actuation mechanism for moving said link 48 is located at said inclination joint, and a clear and unobstructed chamber 49 wherein said mechanism may be housed is provided by the use of the aforementioned trunnions 15 and 16, instead of the more common through axle, for pivoting the arm 14. Said chamber 49 is formed by a pair of parallel side walls 50 and 51 and a connecting rear wall 52 so that the inner areas thereof are particularly free of inward protrusions or axles in order that ample room may be provided for the accommodation of the actuating parts of the fine adjustment mechanism hereinafter described.

One of the novel features of this invention is the actuating means for the fine adjustment link 48 whereby the rate of motion that is imparted to the link is very slow but the range of motion thereof is uncommonly large. Said means comprises a rotatable disk or actuating member 53 having a protruding hub 54 which is fixed on an operating rod or shaft 55 in any preferred manner such as the lock screw 56. Preferably the shaft 55 is rotatably journaled in both trunnions 15 and 16 substantially coaxial with the inclination axis of the arm 14 so that the shaft 55 extends through said chamber 49 and exteriorly thereof at both sides. Operating knobs 57 and 58 are suitably fixed to the protruding ends of shaft 55 to facilitate its rotation.

In one lateral face of the disk or actuating member 53 and normal thereto, a square sided channel or scroll 59 having a spiral configuration of low pitch and multiple convolutions is formed with a pair of parallel smooth walls 60 and 61 which serve as camming tracks or surfaces. The outer and inner terminal ends 62 and 63, respectively, of spiral channel or cam track 59 are closed and thus form abutment or stop means for limiting the rotation of the member 53 as hereinafter set forth. Said channel 59 preferably occupies substantially the entire radial face of the disk 53, the diameter of which may be so chosen as to obtain a maximum range in the travel of the operating link 48.

The lower end of link member 48 carries a flat plate 64 which lies contiguously to and across the radial face of the disk 53. In the lower part of the plate 64 there is anchored a cam follower or pin 65 which extends into sliding engagement with one or the other of said cam tracks or smooth side walls 60 or 61 of the channel 59. Guide means for the lower end of said link 48 are provided in the preferred form of this invention by an elongated, substantially vertical slot 66 formed in the plate 64 in a direction substantially lengthwise of said arm 14 and having the two smooth, parallel surfaces 67 and 68 which straddle the operating rod or shaft 55 and have sliding contact thereon. The slot 66 extends in a substantially vertical direction with its longitudinal axis intersecting the axis of shaft 55 so that when the disk 53 is rotated the link 48 is constrained to move in a substantially straight line vertical direction. For removing backlash from the fine adjustment mechanism there is provided a tension spring 69 anchored at one end on an extension of the pivot pin 47 and at the other end on a pin 70 fixed in the arm 14. For transverse support of the link plate 64 and retention of the cam follower pin 65 in the channel 59, a retainer plate 71 covering the channel 59 is provided having a hub 72 thereon which is locked onto the operating shaft 55 by a lock screw 73. The plate 71 lightly contacts the adjacent side of the plate 64 so as to confine the latter between the disk 53 and plate 64.

In operation, rotation of the coarse adjustment shaft 29 and pinion 32 causes movement of the rack 33 and its attached lens tube 25 to focus the microscope in the usual manner. During this movement the frictional connection between the flange 39 and lever 38 slips because the fine adjustment mechanism acts as an anchor for the outer end of the lever. For fine adjustments of tube 25, the disk member 53 is rotated by the knob 57 or 58 whereupon the cam follower pin 65 is carried along the track or channel 59 and the link 48 is cammed approximately in the direction of the slot 66 in a substantially straight line and in a generally vertical direction to provide translatory motion of link 48 to raise or lower the end of the lever 38 and thereby slowly rotate the coarse adjustment shaft 29 to move the lens tube 25 for the purpose of focusing the lens system carried thereby.

A second form of this invention is shown in Figs. 5, 6 and 7 wherein a microscope generally designated by the numeral 10 comprises parts similar to the first embodiment and all similar parts are similarly numbered. On a base 11 is suitably pivoted an arm 14 which carries the usual objective tube 25 at its upper end. Said objective tube is moved by means of a rack and pinion connection, the pinion 32 of which is fixed to a coarse adjustment shaft 78 that is journaled in an outboard bearing member 79 on the upper part of the arm 14. To the shaft 78 is secured two operating knobs 80 and 81 preferably by means of the set screws 82 and 83, respectively.

In this form of the invention, the fine adjustment mechanism for moving the lens tube 25 comprises a scissors type of friction clutch having an operating lever 84 and a clutch lever 85 both of which are loosely journaled on a cylindrical clutch surface 86 formed integrally on the inner end of the knob 81. These two levers 84 and 85 are pivotally connected to each other by a pivot pin 87 which is fixed in one lever and is rotatably fitted in the other lever. Resilient means are provided for biasing the outer ends of the levers 84 and 85 away from each other so as to create an effective frictional drive pressure between the journaled ends of said levers and the clutch surface 86. Such means comprise a torsion spring 88 which is held under pressure by seating the outer ends thereof in suitable openings 89 and 90 formed in the respective levers.

Connecting the operating lever 84 to its actuating mechanism is an operating link 91 which has its upper end connected to said lever 84 by means of an open ended slot 92 into which is slidably fitted a drive pin 93 which is anchored in the operating lever 84.

The operating link 91 is slidably mounted for substantially straight line vertical movement on the arm 14 by means of a pair of rods or headed studs 94 and 95 which extend, respectively, through a pair of vertically elongated slots 96 and 97 formed in link 91 and are slidably fitted therein. The rods or studs 94 and 95 are suitably secured, respectively, in the upstanding bosses 98 and 99 on the arm 14 whereby the link 91 is spaced from the inner wall thereof and the vertical central planes of the studs 94, 95 the slots 96, 97 and shaft 101 are substantially coincident.

For moving the link 91, an actuating member or disk 100 similar to that described in the first embodiment of the invention is provided, said member being fixed to a rotatable shaft 101 that is journaled at 102 and 103 at a low position in the sides of said arm. In one radial face of the disk member 100 there is formed a spiral or scroll type of channel or track 104 with which is operatively engaged a lateral drive pin 105 which is suitably anchored in the lower end of the link 91 which overlies the face of disk 100. The link 91 is guided or constrained to move with translatory motion in a substantially vertical direction by the cooperation of the studs 94 and 95 with their companion slots 96 and 97. Knobs 106 and 107 are secured by set screws to the outer ends of the shaft 101 for its rotation. The operation of this form of the invention is substantially the same as above described relating to the preferred form of the invention.

In both forms of this invention, the fine adjustment mechanism features an actuating member or disk having a multi-convoluted scroll type of track or camming surface for moving the operating linkage. Since the radial lead of the scroll-shaped camming surface may be made very low by designing a proper cam follower, it will be apparent that a very narrow channel width is made possible by substituting a thin blade type of cam follower instead of the disclosed pin type follower. The narrower the channel width, the greater may be the number of convolutions accommodated in a given radial distance and the smaller will be the radial movement of the cammed member for each revolution of the actuating member thereby improving the fineness of the operation. By providing a clear chamber in the lower part of the frame, the radial area of this kind of an actuating member may be increased to a maximum so as to correspondingly obtain a linkage movement of maximum range without sacrificing the advantageous low rate of movement.

It will be seen that there is here provided a fine adjustment mechanism which is simple and inexpensive but capable of high grade performance such as found only in complicated instruments of high cost, all of which fulfills the stated objects of this invention. Although only certain forms of this invention have been shown and described in detail, other forms are possible and changes may be made in the form and arrangement of its parts and substitutions may be made therein without departing from the spirit of the invention as claimed in the claims below appended.

I claim:

1. In a microscope the combination of a hollow arm, a lens tube slidably carried by the arm, means for effecting coarse adjustment movement of the tube including a shaft rotatably carried by the arm, and means for effecting fine adjustment movement of the tube comprising a lever having one end pivotally carried by the arm, friction clutch means operatively connecting the lever to said shaft whereby the shaft may be rotated to effect coarse adjustments without moving the lever, a downwardly extending link slidably mounted for substantially vertical translatory movement within the arm and having its upper portion pivotally connected to the lever, a cam disk mounted in the lower portion of the arm to rotate about a transverse axis, spiral cam track means carried by a lateral face of the disk and cam follower means carried by the lower portion of the link and positioned in sliding engagement with the track means whereby rotation of the disk will move the link and lever to effect rotation of the shaft to provide fine adjustment movements of the lens tube.

2. In a microscope having a body tube slidably carried by a hollow support arm and means for moving the body tube to effect coarse adjustments including a shaft journaled in the upper part of the arm, the combination of means for effecting fine adjustments of the body tube comprising a lever journaled on the shaft within the arm, a radial flange fixed to the shaft adjacent the lever and means normally urging adjacent faces of the flange and lever into frictional engagement for transmitting motion of said lever to the shaft while permitting rotation of the shaft for coarse adjustments without moving the lever, a rigid link extending downwardly within the arm, the upper part of the link being pivotally connected to the free end of the lever, means in the lower part of the arm operatively connected to the lower portion of the link for moving the latter rectilinearly in a direction substantially lengthwise of the arm whereby fine adjustment movements of the tube may be effected.

3. In a microscope having a body tube slidably carried by a hollow arm and means for moving said tube along said arm including a coarse adjustment shaft journaled in the upper part of said arm, the combination of a radial flange fixed on said shaft, a fine adjustment lever pivotally mounted on said shaft and having a frictional surface thereon engaging one side of said flange to cooperatively form a frictional clutch, a longitudinally adjustable abutment member anchored on the shaft adjacent to said lever, resilient means compressively held between said lever and abutment member to apply pressure to said clutch whereby the shaft may be rotated to effect coarse adjustments without moving the lever, and actuating means for said lever comprising a cam disk rotatably mounted in the lower part of said arm on an axis transverse to said arm, means including parallel spiral cam tracks formed normally to a face on said disk for cooperatively defining a spiral channel of more than one turn, a link mounted for rectilinear movement within the arm and having its upper portion pivotally connected to the outer end of said lever, a cam follower carried by the lower end of the link and in sliding engagement with said cam tracks and means for vertically guiding the lower end of said link whereby rotation of said disk imparts motion to the shaft to produce a fine adjustment motion of said tube.

4. In a microscope the combination of a hollow support arm, a lens tube slidably mounted on the upper part of the arm, means for moving the tube for coarse adjustments including a shaft rotatably carried at the upper part of the arm, means for effecting fine adjustment movement of the tube comprising a lever journaled on the shaft within the arm, frictional clutch means operatively connecting the lever to the shaft for transmitting movement of the lever to the shaft while permitting rotation of the shaft for coarse adjustments without moving the lever, a rigid link extending downwardly within the arm, the upper end of the link being pivotally connected to an end of the lever, a cam disk fixed to a second shaft rotatably mounted in the lower portion of the arm, spiral cam track means formed normally to a side of the disk, a cam follower carried by the lower portion of the link and in operative engagement with the track means, the lower portion of the link having an elongated upwardly extending straight sided slot through which the second shaft extends, whereby rotation of the second shaft will effect translatory movement of the link in a substantially vertical direction and thereby move the lever to effect fine adjustment of the lens tube.

References Cited in the file of this patent

UNITED STATES PATENTS

| | | |
|---|---|---|
| 893,957 | Watkins | July 21, 1908 |
| 989,784 | Kaemmerer | Apr. 18, 1911 |
| 2,208,839 | Gallasch et al. | July 23, 1940 |
| 2,489,804 | Newick | Nov. 29, 1949 |
| 2,563,789 | Kurtz et al. | Aug. 7, 1951 |